US006841075B2

(12) United States Patent
Penth et al.

(10) Patent No.: US 6,841,075 B2
(45) Date of Patent: *Jan. 11, 2005

(54) PERMEABLE COMPOSITE MATERIAL, METHOD FOR PRODUCING SAID COMPOSITE MATERIAL, AND USE OF THE SAME

(75) Inventors: Bernd Penth, Lebach (DE); Christian Hying, Rhede (DE); Gerhard Hoerpel, Nottuln (DE); Friedrich Georg Schmidt, Haltern (DE)

(73) Assignee: Creavis Gesellschaft Fuer Technologie und Innovation mbH, Marl (DE)

( * ) Notice: Subject to any disclaimer, the term of this patent is extended or adjusted under 35 U.S.C. 154(b) by 331 days.

This patent is subject to a terminal disclaimer.

(21) Appl. No.: 09/941,587

(22) Filed: Aug. 30, 2001

(65) Prior Publication Data

US 2002/0023874 A1 Feb. 28, 2002

Related U.S. Application Data

(62) Division of application No. 09/308,219, filed as application No. PCT/EP98/05939 on Sep. 18, 1998.

(30) Foreign Application Priority Data

| Sep. 20, 1997 | (DE) | ......... 197 41 498 |
| Mar. 18, 1998 | (DE) | ......... 198 11 708 |
| Mar. 19, 1998 | (DE) | ......... 198 12 035 |
| May 8, 1998 | (DE) | ......... 198 20 580 |
| Jun. 3, 1998 | (DE) | ......... 198 24 666 |

(51) Int. Cl.$^7$ ............................................. B01D 61/00
(52) U.S. Cl. ............. 210/650; 210/500.25; 210/500.26; 210/490; 264/41; 55/523; 55/524; 55/45; 204/157.3; 96/4
(58) Field of Search .......................... 210/490, 500.25, 210/500.26, 650; 264/54.1; 55/523, 524, 282.3; 85/45; 96/4; 204/157.3; 95/45, 278, 283

(56) References Cited

U.S. PATENT DOCUMENTS

| 4,923,608 A | | 5/1990 | Flottmann et al. |
| 4,946,592 A | | 8/1990 | Galaj et al. |
| 4,981,590 A | * | 1/1991 | Van 'T Veen et al. ...... 210/490 |
| 5,059,366 A | | 10/1991 | Galaj et al. |
| 5,376,442 A | | 12/1994 | Davidson et al. |
| 5,885,657 A | | 3/1999 | Penth |
| 6,299,668 B1 | | 10/2001 | Penth et al. |
| 6,299,778 B1 | | 10/2001 | Penth et al. |
| 6,309,545 B1 | | 10/2001 | Penth et al. |
| 6,340,379 B1 | | 1/2002 | Penth et al. |
| 6,383,386 B1 | | 5/2002 | Hying et al. |

FOREIGN PATENT DOCUMENTS

| EP | 0263468 | 10/1987 |
| EP | 0332789 | 3/1988 |
| EP | 0426546 | 10/1990 |
| EP | 0585152 | 7/1993 |
| EP | 0778076 | 11/1996 |
| WO | 96/00198 | 1/1996 |
| WO | 99/15262 | 4/1999 |

* cited by examiner

Primary Examiner—Ana M. Fortuna
(74) Attorney, Agent, or Firm—Oblon, Spivak, McClelland, Maier & Neustadt, P.C.

(57) ABSTRACT

A claim is laid to a permeable composite, a process of production of the composite as well as the use of this composite. The composite essentially contains a perforated and permeable carrier, on and in or on or in which another component that essentially contains metallic compounds with elements from group III to VI of the periodic system is stabilized. Stabilization of the component on or in the carrier is carried out by heating a suspension consisting of the component suspended in a metallic oxide sol that has been applied onto or into or onto and into the carrier.

In this way, it is possible to produce a permeable composite that is ideally suited for use in filtration and membrane technologies under very mild conditions either by heating for a short time or warming for a longer time.

38 Claims, No Drawings

PERMEABLE COMPOSITE MATERIAL, METHOD FOR PRODUCING SAID COMPOSITE MATERIAL, AND USE OF THE SAME

This application is a Division of application Ser. No. 09/308,219 filed on Aug. 13, 1999, now allowed, which was originally filed as International Application No. PCT/EP98/05939, filed Sep. 18, 1998.

A claim is laid to a composite, a process of production and use of this permeable composite.

There are several different applications known where composites containing ceramic materials are used.

The advantage of composites containing ceramic material is in the fact that ceramic coatings are chemically inert against most chemical substances such as organic substances and besides this are generally resistant to acids or caustic solutions. For this reason metals are often coated with ceramic materials in order to protect the metal from chemical attack. In addition to this, the porous surface of a composite coated with a ceramic material increases the abrasion resistance of paints or protective coatings that are applied at a later date. Because of their porous surface, ceramic materials themselves are very suitable for use as membranes or filters.

The disadvantage of ceramic materials or composites containing ceramic materials is the brittleness of the ceramic material. Metals coated with ceramic material are therefore very susceptible to shocks, and the ceramic coating rarely survives mechanical stresses without the surface of the ceramic material being damaged. Since bending such a ceramic composite also damages the ceramic coating, the fields of application of such ceramic composites are limited at the present time.

In spite of the disadvantages, ceramic composites are often used in filtration and membrane technology.

EP 0358 338 describes a process in which an aqueous solution containing a metallic oxide sol is applied to and stabilized on a—preferably smooth metallic—surface, thus protecting this surface with a ceramic coating. To improve the bond between the ceramic coating and the surface to be protected a metallic oxide powder and/or a bond-improving agent can be added to the aqueous solution. The process does not describe the coating of permeable carrier materials.

WO 96/00198 shows the production of ceramic coatings on surfaces made from different materials. These coated materials can be used as membranes in nano-filtration. In this process, titanium dioxide sol is dispersed with aluminum oxide powder, whereby hydrochloric acid is used as a peptizing agent.

U.S. Pat. No. 4,934,139 shows a process for the production of ceramic membranes for ultra-filtration and micro-filtration. For the production of such ceramic membranes, a sol or a particle suspension is applied to a metallic carrier and sintered. The porous carrier can be stainless-steel-sintered metal or stainless steel mesh where metallic particles have been sintered into the gaps. Metallic mesh with gaps of more than 100 $\mu$m cannot be produced using this process without sintering in metallic particles. The process prevents the suspension or the sol from penetrating the gaps in the carrier material.

In U.S. Pat. Nos. 5,376,442 and 5,605,628, an organic bonding agent is worked into the coating solution to bridge the gaps in the carrier material. This bonding agent must be removed attain during stabilization, which can lead to irregularities in the ceramic material surface and/or structure.

Also in DE 4210413, the inorganic powder is fixed with the aid of a polymer resin. This resin must also be removed during stabilization, which can lead to irregularities in the ceramic material surface and/or structure.

With the above-mentioned processes it is not possible to produce composites containing ceramic material, where ceramic material is contained in and on the carrier material, without the ceramic coating being damaged either during production or application.

The basis of the invention at issue is therefore to obtain a composite that contains ceramic components on and in the carrier and to find a simple and economic process of producing such a composite.

Surprisingly, it was found to be the case that a permeable composite based on at least one perforated and permeable carrier containing at least one inorganic component on at least one side of the carrier and inside the carrier, which essentially contains a compound consisting of a metal and at least one element from group III to VII of the periodic system, can be produced simply and at a reasonable price.

Subject matter of the invention at issue is therefore a permeable composite based on at least one perforated and permeable carrier containing at least one inorganic component on at least one side of the carrier and inside the carrier, which essentially contains a compound consisting of a metal and at least one element from group III to VII of the periodic system.

Further subject matter of the invention at issue is a permeable composite, which is obtained by application of a suspension that contains at least one inorganic compound, which is a compound of at least one metal with at least one element from group III to VII of the periodic system, and a sol on a perforated and permeable carrier, which is then heated at least once to stabilize the suspension containing at least one inorganic component onto or into or onto and into the carrier.

Further subject matter of the invention at issue is a process to produce a composite as claimed in one of claims 1 to 30, wherein at least one suspension, which contains at least one inorganic component from at least one compound of at least one metal with at least one of the elements of group III to VII of the periodic system, is applied in and on at least one perforated and permeable carrier, and is stabilized in or on or in and on the carrier material when the suspension is subsequently heated at least once.

Subject matter of the invention at issue is furthermore the use of a composite according to at least one of the claims 1 to 30 as a filter to separate mixtures.

Permeable composites or carriers respectively are materials that are permeable for substances with a particle size of between 0.5 nm and 500 $\mu$m, depending on the style of execution of the composite or carrier respectively. The substances can be gaseous, liquid or solid or in a mixture of these states of aggregation.

The composite according to invention has the advantage that inorganic components can be stabilized on and in a perforated and permeable carrier, which allow this composite to have permeable properties, without the coating being damaged during production.

The composite according to invention also has the advantage that, although it partly consists of a ceramic material, it can be bent to a radius of up to 1 mm. This property enables an especially simple process of producing this composite, as the composite created by coating with a ceramic material can be wound on or off a roll.

The process of producing the composite according to invention also has the advantage that carriers with perforated surfaces with a maximum gap size of 500 μm can be coated. The in especially careful conditions during stabilization of the suspension in or on the carrier enable carrier materials to be used that cannot be subjected to high temperatures or only subjected to high temperatures for a very short time.

The composite according to invention, which is produced according to the process that is the subject of the invention, is ideally suited for use as a filter or membrane. The possibility of also being able to use carriers that have gaps with a size of up to 500 μm allows the use of exceptionally reasonably priced materials. The particle size used in combination with the gap size of the carrier material used allows the pore size and/or the pore size distribution to be easily adjusted in the composite so that special membranes can be produced for special applications.

The composite according to invention is described in the following as an example, without the composite according to invention being limited to this style of execution.

The permeable composite according to invention has a basis of at least one perforated and permeable carrier. On at least one side of the carrier and inside the carrier, the carrier contains at least one inorganic component that contains essentially at least one compound consisting of at least one metal, metalloid or composition metal with at least one element from group III to VII of the periodic system. The inside of a carrier in the invention at issue means hollows or pores in a carrier.

The permeable composite according to invention can be obtained by the application of a suspension containing at least one inorganic component, which contains a compound of at least one metal, metalloids or composition metal with at least one element from group III to VII of the periodic system, and a sol on at least one perforated and permeable carrier, which is subsequently heated at least once to stabilize the suspension containing at least one inorganic component on or in or on and in at least one carrier.

However, the permeable composite according to invention can also be obtained by chemical vapor deposition, impregnation, or co-precipitation.

According to invention, the permeable composite can be permeable for gases, ions, solids or liquids, whereby the composite can be permeable for particles with a size of between 0.5 nm and 10 μm.

According to invention, the perforated and permeable carrier can have gap sizes of between 0.02 and 500 μm. The gaps can be pores, mesh, holes, crystal lattice gaps or hollows. The carrier can contain at least one material from the following: carbon, metals, alloys, glass, ceramic materials, minerals, plastics, amorphous substances, natural products, composites or at least one combination of these materials. The carriers, which can contain the above-mentioned materials, could have been modified by a chemical, thermal, or mechanical treatment or a combination of treatments. The composite preferably contains a carrier, which contains at least one metal, a natural fiber or a plastic, which has been modified by at least one mechanical deformation or treatment technology respectively, such as drawing, swaging, flex-leveling, milling, stretching or forging. It is absolutely preferable that the composite contains at least one carrier that has at least woven, glued, felted or ceramically bound fibers or at least sintered or glued formed bodies, spheres or particles. In another preferred construction, a perforated carrier can be used. Permeable carriers can also be carriers that become or were made permeable by laser or ion beam treatment.

It can be advantageous, if the carrier contains fibers from at least one of the following materials: carbon, metals, alloys, glass, ceramic materials, minerals, plastics, amorphous substances, natural products, composites or fibers consisting of at least one combination of these materials, such as asbestos, glass fibers, carbon fibers, metal wires, steel wires, rock wool fibers, polyamide fibers, coconut fibers, coated fibers. Preferably carriers are used that at least contain woven fibers made of metal or alloys. Metal fibers can also be wires. Especially preferable is a composite containing a carrier that has at least one mesh made of steel or stainless steel, such as, for example, steel wire, stainless steel wire, or stainless steel fiber meshes produced by weaving. The preferable mesh size is between 5 and 500 μm, the especially preferred mesh size is between 50 and 500 μm and the very specially preferred mesh size is between 70 and 120 μm.

However, the composite carrier can also have at least one expanded metal with a pore size of between 5 and 500 μm. According to invention, the carrier can also have at least one granular sintered metal, one sintered glass or one metal web with a pore width of between 0.1 μm and 500 μm, preferably between 3 and 60 μm.

The composite according to invention has at least one carrier that has at least one of the of following aluminum, silicium, cobalt, manganese, zinc, vanadium, molybdenum, indium, lead, bismuth, silver, gold, nickel, copper, iron, titanium, platinum, stainless steel, steel, brass, an alloy of these materials or a material coated with Au, Ag, Pb, Ti, Ni, Cr, Pt, Pd, Rh, Ru and/or Ti.

The inorganic component contained in the composite according to invention can contain at least one compound of at least one metal, metalloid or composition metal smith at least one element from group III to VII of the periodic system or at least one mixture of these compounds. Moreover, the compounds of metals, metalloids or composition metals can contain at least elements of the transitional element groups and of group III to V of the periodic system or at least elements of the transitional element groups or of group III to V of the periodic system, whereby these compounds have a particle size of between 0.001 and 25 μm. Preferably the inorganic component contains at least one compound of an element of group III to VIII of the transitional element groups or at least one element of group III to V of the periodic system with at least one of the elements Te, Se, S, O, Sb, As, P, N, Ge, Si, C, Ga, Al or B or at least one compound of an element of group III to VIII of the transitional element groups and at least one element of group III to V of the periodic system with at least one of the elements Te, Se, S, O, Sb, As, P, N, Ge, Si, C, Ga, Al or B or a mixture of these compounds. It is especially preferred if the inorganic component contains at least one compound of at least one of the elements Sc, Y, Ti, Zr, V, Nb, Cr, Mo, W, Mn, Fe, Co, B, Al, Ga, In, Tl, Si, Ge, Sn, Pb, Sb or Bi with at least one of the elements Te, Se, S, O, Sb, As, P, N, C, Si, Ge or Ga, such as, for example, $TiO_2$, $Al_2O_3$, $SiO_2$, $ZrO_2$, $Y_2O_3$, BC, SiC, $Fe_3O_4$, SiN, SiP, nitrides, sulfates, phosphides, silicides, spinels or yttrium aluminum garnet, or one of these elements itself. The inorganic component can also have alumosilicates, aluminumphosphates, zeolites or partially substituted zeolites, such as, for example, ZSM-5, Na-ZSM-5 or Fe-ZSM-5 or amorphous microporous mixed oxide systems, which can contain up to 20% non-hydrolyzable organic compounds, such as, for example, vanadium oxide-silicium oxide-glass or aluminum oxide-silicium oxide-methyl silicium sesquioxide-glasses.

Preferably there is at least one inorganic component in a particle size fraction with a particle size of between 1 and 250 nm or with a particle size of between 260 and 10000 nm.

It can be advantageous if the composite according, to invention contains at least two particle size fractions of at least one inorganic component. It can also be advantageous if the composite according to invention contains at least two particle size fractions of at least two inorganic components. The particle size proportion can be between 1:1 and 1:10000, preferably between 1:1 and 1:100. The proportion of ingredients of the particle size fraction in the composite can preferably be between 0.01:1 and 1:0.01.

The permeability of the composite according to invention is limited by the particle size of the at least one inorganic component used to particles with a certain maximum size.

The suspension containing an inorganic component, which allows the composite according to invention to be obtained, can contain at least one liquid from the following water, alcohol and acid or a combination of these liquids.

In an especially preferred style of execution of the composite according to invention, this composite can be constructed in such a way that it can be bent without the inorganic components stabilized on the inside of the carrier and/or on the carrier being destroyed. The composite according to invention is preferably flexible to a smallest radius of up to 1 mm.

The process according to invention for the production of a composite according to invention is described in the following as an example without being limited to this example.

In the process according to invention for the production of the composite according to invention, at least one suspension containing at least one inorganic component consisting of at least one compound of one metal, metalloid or composition metal with at least one element from group III to VII of the periodic system is applied into and onto at least one perforated and permeable carrier. The suspension is stabilized on or in or on and in the carrier material by being heated at least once.

In the process according to invention it could be advantageous to apply the suspension onto and into or onto or into at least one carrier by stamping on, pressing on or in, rolling on, applying with a blade or a brush, dipping, spraying or pouring.

The perforated and permeable carrier, onto or into or onto and into which at least one suspension is applied, can contain at least one of the following materials carbon, metals, alloys, glass, ceramic materials, minerals, plastics, amorphous substances, natural products, composites or at least one combination of these materials. Permeable carriers can also be ones that have been made permeable by treatment with laser or ion beams. Preferably carriers are used that consist of mesh made of fiber or wire made from the above-mentioned materials such as, for example, metallic or plastic mesh.

The suspension used which can contain at least one inorganic component and at least one metallic oxide sol, at least one metalloid oxide sol, or at least one composition metallic oxide sol or a mixture of these sols, can be produced by suspending at least one inorganic component in at least one of these sols.

The sols are obtained by hydrolyzing at least one compound, preferably at least one metallic compound, at least one metalloid compound or at least one composition metallic compound with at least one liquid, one solid or one gas, whereby it can be advantageous if as a liquid water, alcohol or an acid, as a solid ice or as a gas water vapor or at least one combination of these liquids, solids or gases is used. It could also be advantageous to place the compound to be hydrolyzed in alcohol or an acid or a combination of these liquids before hydrolysis. As a compound to be hydrolyzed it is preferable to hydrolyze at least one metal nitrate, one metal chloride, one metal carbonate, one metal alcoholate compound or at least one metalloid alcoholate compound. Especially preferable is at least one metal alcoholate compound, one metal nitrate, one metal chloride, one metal carbonate or at least one metalloid alcoholate compound from compounds of the elements Ti, Zr, Al, Si, Sn, Ce and Y or the lanthanides and actinides, such as, for example, titanium alcoholates, such as, for example, titanium isopropylate, silicium alcoholates, zirconium alcoholates, or a metallic nitrate, such as, for example, zirconium nitrate.

It can be advantageous to carry out the hydrolysis of the compounds to be hydrolyzed with at least half the mol ratio water, water vapor or ice in relation to the hydrolyzable group of the hydrolyzable compound.

For peptizing, the hydrolyzed compound can be treated with at least one organic or inorganic acid, preferably with a 10 to 60% organic or inorganic acid, especially preferred with a mineral acid from the following: sulfuric acid, hydrochloric acid, perchloric acid, phosphoric acid and azotic acid or a mixture of these acids.

Not only sols produced as described above can be used, but also commercially available sols such as titanium nitrate sol, zirconium nitrate sol or silica sol.

It can be advantageous if at least one inorganic component having a particle size of between 1 and 10000 nm is suspended in at least one sol. Preferably an inorganic component is suspended containing at least one compound from the following: metallic compounds, metalloid compounds, composition metallic compounds and metallic mixture compounds with at least one of the elements from group III to VII of the periodic system or at least a mixture of these compounds. It is especially preferred if at least one inorganic component is suspended, which contains at least one compound from the oxides of the transition element groups or from the elements of group III to V of the periodic system, preferably oxides from the following elements: Sc, Y, Ti, Zr, Nb, Ce, V, Cr, Mo, W, Mn, Fe, Co, B, Al, In, Tl, Si, Ge, Sn, Pb and Bi, such as, for example, $Y_2O_3$, $ZrO_2$, $Fe_2O_3$, $Fe_3O_4$, $SiO_2$, $Al_2O_3$. The inorganic component can also contain alumo silicates, aluminum phosphates, zeolites or partially substituted zeolites, such as, for example, ZSM-5, Na-ZSM-5 or Fe-ZSM-5 or amorphous microporous mixed oxide systems, that can contain up to 20% non-hydrolyzable organic compounds, such as, for example, vanadium oxide-silicium oxide-glass or aluminum oxide-silicium oxide-methyl silicium sesquioxide-glasses.

Preferably the percentage by mass of the suspended component should be 0.1 to 500 times the hydrolyzed compound used.

The fracture resistance in the composite according to invention can be optimized by a suitable choice of the particle size of the suspended compounds in dependence on the size of the pores, holes or gaps of the perforated permeable carrier, but also by the layer thickness of the composite according to invention as well as by the proportional ratio of sol, solvent and metallic oxide.

When using a mesh with a mesh width of, for example, 100 $\mu$m, the fracture resistance can be increased by the preferable use of suspensions containing a suspended compound with a particle size of at least 0.7 $\mu$m. In general, the ratio of particle size to mesh or pore size respectively should be between 1:1000 and 50:1000. The composite according to invention can preferably have a thickness of between 5 and 1000 $\mu$m, especially, preferable is a thickness of between 50 and 150 $\mu$m. The suspension consisting of sol and compounds to be suspended preferably has a ratio of sol to compounds to be suspended of 0.1:100 to 100:0.1, preferably of 0.1:10 to 10:0.1 parts by weight.

According to invention, the suspension that is present on or in or on and in the carrier can be stabilized by heating this composite to between 50 and 1000° C. In a special variant of the process according to invention, this composite is subjected to a temperature of between 50 and 100° C. for 10 minutes to 5 hours. In a further special style of execution of the process according to invention, this composite is subjected to a temperature of between 100 and 800° C. for 1 second to 10 minutes.

Heating, the composite according to invention can be carried out by means of warmed air, hot air, infrared radiation, microwave radiation, or electrically generated heat. In a special style of execution of the process according to invention it can be advantageous if heating of the composite is carried out using the carrier material as electric resistance heating. For this purpose, the carrier can be connected to an electrical power source by at least two contacts. Depending on the strength of the power source and the voltage released, the carrier heats up when the power is switched on, and the suspension that is present in and on the surface of the carrier can be stabilized by this heat.

In a further especially preferred style of execution of the process according to invention, stabilization of the suspension can be achieved by applying the suspension onto or into or onto and into a preheated carrier thus stabilizing it immediately upon application.

In a further special style of execution of the process according to invention it can be advantageous that at least one carrier is rolled from a roll and—at a speed of between 1 m/h and 1 m/s—runs through at least one device that applies the suspension onto or into or onto and into the carrier and through at least one other device that enables the suspension to be stabilized onto or into or onto and into the carrier by heating, and that the composite produced in this way is rolled onto a second roll. In this way it is possible to produce the composite according to invention in a continuous process.

In a further special style of execution of the process according to invention it can be advantageous, if a ceramic or an inorganic layer is applied to the carrier, which can be a composite, a composite according to invention or a composite produced by the process according to invention. To this purpose, a green (unsintered) layer of ceramic material or an inorganic layer, for example, which can, for example, be on an auxiliary film, can be laminated onto the carrier or the composite treated with another suspension as described above. This composite can be stabilized by heating, for example, by infrared radiation or in a kiln.

The green ceramic material layer that is used preferably contains nanocrystalline powder from at least one metalloid oxide or metallic oxide, such as, for example, aluminum oxide, titanium dioxide or zirconium dioxide. The green layer can also contain an organic bonding agent.

By using a green ceramic material layer it is a simple matter to provide the composite according to invention with an additional ceramic layer, which—according to the size of the nanocrystalline powder used—limits the permeability of the composite produced in this way to smallest particles.

Preferably, the green layer of nanocrystalline powder has a particle size of between 1 and 1000 nm. If nanocrystalline powder with particle sizes of between 1 and 10 nm is used, the composite according to invention, onto which an additional ceramic layer has been applied, has a permeability for particles with a size corresponding to the particle size of the powder that was used. If nanocrystalline powder with a size of more than 10 nm is used, the ceramic layer is permeable for particles that are half as large as the particles of the nanocrystalline powder that was used.

By applying at least one other inorganic or ceramic material layer according to invention, a composite according to invention is obtained that has a pore gradient. To produce composites with a defined pore size, it is also possible to use carriers, whose pore or mesh size respectively is not suitable for the production of a composite with the required pore size, if several layers are applied. This can, for example, be the case when a composite with a pore size of 0.25 $\mu$m is to be produced using a carrier with a mesh width of more than 300 $\mu$m. To obtain such a composite it can be advantageous to apply at least one suspension on the carrier, which is suitable for treating carriers with a mesh width of 300 $\mu$m, and stabilizing this suspension after application. The composite obtained in this way can then be used as a carrier with a smaller mesh or pore size respectively. Another suspension, for example, that contains, for example, a compound with a particle size of 0.5 $\mu$m can be applied to this carrier.

The fracture indifference of composites with large mesh or pore widths respectively can also be improved by applying suspensions to the carrier that contain at least two suspended compounds. Preferably, suspended compounds are used that have a particle size ratio of 1:1 to 1:10, especially preferred is a ratio of between 1:1.5 and 1:2.5. The proportion by weight of the particle size fraction with the smaller particle size should not exceed a proportion of 50% at the most, preferably 20% and especially preferably 10% of the total weight of the particle size fraction.

In spite of an additional layer of ceramic material or inorganic material being applied to the carrier, the composite according to invention can be flexible.

The composite according to invention can also be produced by placing a carrier, that can be, for example, a composite according to invention or another suitable carrier material, onto a second carrier that can be the same material as the first carrier or another material or two carriers of different permeability or porosity respectively. A spacer, a drainage material or another material suitable for material conduction, for example, a mesh composite, can be placed between the two carrier materials. The edges of both carriers are connected to each other by various processes, for example, soldering, welding or adhering. Adhering can be done with commercially available bonding agents or adhesive tape. The suspension can then be applied to the carrier composite that has been produced in the above-mentioned ways.

In an especially preferred style of execution, the two carriers placed on top of each other with at least one spacer, drainage material or similar material placed between them, can be rolled up before or after joining the edges of the carrier, but preferably after joining. By using thicker or thinner adhesive tape to join the edges of the carrier, the space between the two carrier composites that are placed on top of each other can be influenced during rolling. A suspension as described above can be applied to such carrier composites that have been rolled up in this way, for example, by dipping in a suspension. After dipping, the carrier composite can be freed of surplus suspension with the aid of compressed air. The suspension that has been applied to the carrier composite can be stabilized in the above-mentioned manner. A composite produced in the above-mentioned manner can be used in a wound module as a form-selective membrane.

In another special style of execution of the process according to invention, the above-mentioned carrier composite can also be produced when two carriers and, if intended, at least one spacer are rolled from one roll and then placed on top of each other. The edges can again be joined by soldering, welding or adhesion or other suitable processes of joining flat bodies. The suspension can then be applied to the carrier composite produced in this manner. This can be done, for example, by the carrier composite being sprayed or painted with the suspension or the carrier composite being drawn through a bath containing the suspension. The applied suspension is stabilized according to one of the above-mentioned processes. The composite produced in this way can be around onto a roll. Another inorganic layer can be applied into and/or onto such a material by a further application and stabilization of a further suspension. Using different suspensions allows the material properties to be adjusted according to wish or intended use respectively. Not only further suspensions can be applied to these composites, but also unsintered ceramic and/or inorganic layers, which are obtainable by lamination in the above-mentioned way. The described style of execution of the process according to invention can be carried out continuously or intermittently, preferably continuously. A composite produced in this way can be used as a form-selective membrane in a flat module.

The carrier in the composite can, depending on the carrier material, be removed again thus creating a ceramic material that has no further trace of carrier material. For example, if the carrier is a natural material such as a cotton fleece, this can be removed from the composite in a suitable reactor by oxidation. If the carrier material is a metal, such as, for example, iron, this carrier can be dissolved by treating the composite with acid, preferably with concentrated hydrochloric acid. If the composite was also made from zeolite, flat zeolite bodies can be produced that are suitable for form-selective catalysis.

It can be advantageous to use the composite according to invention as a carrier for the production of a composite according to invention.

The composite according to invention can be used as a filter or membrane to separate material mixtures. The composite according to invention is especially suitable as a filter for separating liquid mixtures, gas mixtures, mixtures containing at least one liquid and at least one gas, mixtures containing at least one solid and at least one liquid, and mixtures containing at least one gas and at least one solid or at least one liquid or one gas.

Since the composite according to invention is relatively robust, it can also be used as a filter or membrane in pressurized separation processes.

It is especially advantageous to use the composite as a membrane for micro-filtration, ultra-filtration or nano-filtration.

The composite according to invention can also be used as a diaphragm or battery separator.

Depending on the style of execution, the composite according to invention can be used in catalytic processes. This is especially the case when the composite contains a carrier or an inorganic component that has catalytic properties, such as carriers made from precious metal meshes, for example, platinum nets, or, for example, catalytically active zeolites as an inorganic component.

It can be advantageous to combine preferred styles of execution of the process according to invention with at least one other preferred style of execution of process according to invention. It can also be advantageous to combine preferred styles of execution of the composite according to invention with at least one other special style of execution or form of the composite according to invention. Further styles of execution of the process according to invention, of the composite according to invention and/or further possibilities for using the process according to invention or composite according to invention are opened up to the specialist with knowledge of the invention at issue.

The invention at issue is described in the following examples without being limited to these examples.

EXAMPLE 1.1

120 g titanium tetraisopropylate is mixed with 140 g de-ionized ice and stirred vigorously until the resulting precipitation is finely dispersed. After adding 100 of 25% hydrochloric acid, the mixture is stirred until it becomes clear and then 280 g aluminum oxide type CT3000SG from Alcoa. Ludwigshafen, is added and stirred for several days until all the aggregates are dissolved. The suspension is then used.

EXAMPLE 1.2

80 g titanium tetraisopropylate is hydrolyzed with 20 g water and the resulting precipitation is peptized with 120 g azotic acid (25%). This solution is stirred until it becomes clear and, after the addition of 40 g titanium dioxide from Degussa (P25) is stirred further until the agglomerates dissolve. The suspension is then used.

EXAMPLE 1.3

90 g titanium isopropylate is mixed with 40 g ethanol and hydrolyzed with 10 g water. The precipitating gel is peptized with 80 g of 30% sulfuric acid, and when the gel is completely dissolved, 30 g aluminum oxide from Degussa is added and stirred until the agglomerates are dissolved. The suspension is then used.

EXAMPLE 1.4

20 g aluminum triisopropylate is added to 10 g ethanol and hydrolyzed with 5 g water. The resulting gel is peptized with 45 g azotic acid (15%) and stirred until the gel is completely dissolved. After 60 g vanadium pentoxide from Aldrich has been added and stirred until the agglomerates are completely dissolved, the suspension can be used.

EXAMPLE 1.5

20 g zirconium tetraisopropylate is hydrolyzed with 15 g water and the resulting precipitation is peptized with 30 g azotic acid (25%). After the precipitation has completely dissolved, 60 g zeolite Y (type CBV 780 from Zeolyst) is added and stirred until the agglomerates are completely dissolved, and the suspension is then used.

EXAMPLE 1.6

20 g zirconium tetraisopropylate is hydrolyzed with 15 g water and the resulting precipitation is peptized with 30 g azotic acid (25%). After the precipitation is completely dissolved, 10 g zirconium dioxide from Degussa (particle size 50 nm) is added and stirred until the agglomerates are completely dissolved. The suspension is then used.

EXAMPLE 1.7

20 g zirconium tetraisopropylate is hydrolyzed with 15 g water and the resulting precipitation is peptized with 30 g azotic acid (25%). After the precipitation is completely dissolved, 60 g corundum powder, particle size 10 micrometer (Amperit, HC Stark) is added and stirred until the agglomerates are completely dissolved. The suspension is then used.

EXAMPLE 1.8

40 g titanium isopropylate and 30 g methyl triethoxysilane are mixed with 60 g ethanol and hydrolyzed with 10 g water. The precipitating gel is peptized with 60 g of 30% hydrochloric acid, and after the gel is completely dissolved, 90 g amorphous microporous mixed oxides (see DE 19545042) are added and stirred until the agglomerates are completely dissolved. The suspension is then used.

EXAMPLE 1.9

70 g tetraethoxysilane is hydrolyzed with 20 g water and the resulting precipitation is peptized with 120 g azotic acid (25%). This solution is stirred until it becomes clear and 40 g amorphous silicic acid or amorphous silicium dioxide from Degussa is added and stirred until the agglomerates are completely dissolved. The suspension is then used.

EXAMPLE 1.10

80 g titanium tetraisopropylate is hydrolyzed with 20 g water, and the resulting precipitation is peptized with 120 g azotic acid (25%). This solution is stirred until it becomes clear, and 20 g titanium dioxide from Degussa (P25) and 40 g titanium dioxide in its anatase form are added and stirred until the agglomerates are completely dissolved. The suspension is then used.

EXAMPLE 1.11

40 g titanium tetraisopropylate is hydrolyzed with 20 g water, and the resulting precipitation is peptized with 60 g azotic acid (25%). This solution is stirred until it becomes clear, and 40 g stannic oxide from Aldrich is added and stirred until the agglomerates are completely dissolved. The suspension is then used.

EXAMPLE 1.12

80 g titanium tetraisopropylate is hydrolyzed with 40 g water, and the resulting precipitation is peptized with 120 g hydrochloric acid (25%). This solution is stirred until it becomes clear, and 200 g titanium dioxide from Bayer is added and stirred until the agglomerates are completely dissolved. The suspension is then used.

EXAMPLE 1.13

120 g titanium tetraisopropylate is stirred together with 140 g de-ionized ice and stirred vigorously until the resulting precipitation is finely dissolved. After the addition of 100 g 25% azotic acid the mixture is stirred until it becomes clear and 280 g aluminum oxide type CT3000SG from Alcoa, Ludwigshafen is added and stirred over several days until the aggregates are dissolved. The suspension is then used.

EXAMPLE 1.14

20 g titanium tetraisopropylate and 120 g titanium hydroxide-hydrate (S500-300 test product from Phone-Poulenc) were hydrolyzed or dissolved with 45 g water and peptized with 50 g 25% hydrochloric acid. After the solution has become clear and 300 g aluminum oxide (7988 E330 from Norton Materials) and 50 g iron(III)chloride have been added, the solution is stirred until the agglomerates dissolve. The suspension can then be used.

EXAMPLE 1.15

6 g titanium tetrachloride was hydrolyzed with 10 g of 25% hydrochloric acid. After it has become clear and 13 g aluminum oxide (7988 E330 from Norton Materials) and 2 g ruthenium chloride were added the solution was stirred until the agglomerates dissolve. The suspension can then be used.

EXAMPLE 1.16

20 g zircon nitrate sol (30% from MEL Chemicals) was mixed with 150 g water, 25 g titanium dioxide (Finntianx 78173 from Kemira Pigments) and 210 g glass powder (HK, from Robert Reidt). The suspension can then be used.

EXAMPLE 1.17

10 g zircon nitrate sol (30% from MEL Chemicals) and 50 g titanium dioxide filter cake test product from Sachtzleben were stirred together with 150 g water, 290 g aluminum oxide 713-40 RA from Nabaltec until the agglomerates dissolve. The suspension can then be used.

EXAMPLE 1.18

100 g silica sol (Levasil 200, from Bayer AG) were stirred together with 180 g aluminum oxide AA07 from Sumitomo Chemical until the agglomerates dissolve. The suspension can then be used.

EXAMPLE 1.19

50 g titanium tetraethoxylate were hydrolyzed with 270 g water and peptized with 30 g azotic acid (25%). Then 100 g ethanol and 350 g CT 2000 SG from Alcoa were added and stirred. The suspension can then be used.

EXAMPLE 2.1

A suspension according to example 1.13 is spread with a blade onto a square mesh with a mesh size of 90 µm and dried with the aid of 450° C. hot air within 7 sec. A sheet formed composite is obtained that can be used as a microfiltration membrane with a pore width of 0.2 to 0.4 µm.

The composite is flexible up to a radius of 2 mm without the composite being destroyed.

EXAMPLE 2.2

A suspension according to example 1.2 was applied to a composite as described in example 2.1 by rolling it on to a layer thickness of 10 µm. Stabilization of the suspension was again achieved by drying the composite with 450° C. hot air for a period of 5 sec. A composite was obtained that can be used as a nano-filtration membrane and has a pore width of 30–40 nm.

EXAMPLE 2.3

A suspension according to example 1.10 was sprayed onto the inside of a sintered metal pipe with a pore size of 250 µm. The suspension was dried by blowing 450° C. hot air through the pipe for a period of approx. 6 sec. In this way a catalytic layer that can be activated by ultraviolet light was applied to the inside of the pipe, which is suitable for the degradation of organic components in water.

EXAMPLE 2.4

A ceramic carrier pipe for filtration (7-channel titanium dioxide/aluminum dioxide pipe with a length of 300 mm and a pore width of 4 μm) from CTI was filled in a suspension according to example 1.4 for 10 seconds. After drying at 450° C. for 10 minutes, a ceramic carrier pipe was obtained with a porous catalytically active layer suitable for oxidation reactions that can be used in catalysis.

EXAMPLE 2.5

A suspension according to example 1.8 was rolled on to GORE-TEX', a stretched polymer membrane from Gore. Drying was done by subjecting the composite consisting of suspension and carrier to a temperature of 80° C. in a kiln for 30 minutes. This process allowed the production of the first composite consisting of a hydrophobic membrane and metallic oxides that were applied onto or into the membrane. This composite can also be used in filtration technology.

EXAMPLE 2.6

By pressing a suspension according to example 1.5 into a woolen fleece and drying the fleece by subjecting the composite consisting of fleece and suspension to a temperature of 60° C. in a kiln for 120 minutes, a zeolite formed body was obtained as a composite that is suitable for form-selective catalysis. The carriers can be removed again by oxidation processes after being installed in suitable reactors.

EXAMPLE 2.7

A ceramic micro-filtration membrane ($\alpha$-$Al_2O_3$, type 19/3 3) from Atech was dipped in a suspension according to example 1.6. The composite consisting of suspension and ceramic membrane was dried by blowing it with 450° C. hot air for 10 minutes. A filtration membrane was obtained that has a pore radius of 4 nm.

EXAMPLE 2.8

A suspension according to example 1.8 was applied to a porous polyethylene film by rolling. The composite consisting of suspension and carrier was then dried in a kiln for 30 minutes at a temperature of 80° C. This process allotted the first successful production of a composite consisting of a hydrophobic membrane and metallic oxides that were applied onto or into the membrane. This composite can also be used in filtration technology.

EXAMPLE 3.1

A suspension produced according to example 1.13 was applied to a composite produced according to example 2.1, which is used as a carrier by spreading it on, whereby instead of aluminum oxide type CT3000SG, the same amount of aluminum oxide with a particle size of 250 nm (Permalox Alcoa) was used. By blowing the suspension with 450° C. hot air it dried within 2 sec. A sheet-formed composite was obtained that can be used as a micro-filtration membrane with a pore size of 0.15 μm. The composite is flexible to a radius of 2 mm without the composite being destroyed.

EXAMPLE 3.2

An unsintered layer consisting of nanocrystalline zirconium dioxide with an average particle size of 5 nm, imbedded in a polyvinyl alcohol film, which was produced by applying a 10% solution of polyvinyl alcohol from Sigma (MW 100000) in water with a blade, was laminated onto a composite produced according to example 2.1 that was used as a carrier and stabilized within one minute by infrared radiation. A flexible composite is obtained that is permeable for particles with a size of between 4 and 6 nm.

EXAMPLE 3.3

A suspension produced according to example 1.1 was spread onto a composite produced according to example 2.1 and used as a carrier, whereby instead of aluminum oxide type CT3000SG, a mixture of aluminum oxide with a particle size of 450 nm (A 16 Alcoa) and 1.2 μm (CT3000SG, Alcoa) with a weight ratio of 20:80 was used. By blowing 450° C. hot air over the suspension it was dried within 2 seconds. A sheet-formed composite was obtained that can be used as a micro-filtration membrane with a pore size of 0.012 μm. The composite is flexible to a radius of 2 mm without the composite being destroyed.

What is claimed is:

1. Permeable flexible composite based on at least one peiforated and permeable carrier, which contains on at least one side of the carrier and inside the carrier at least one inorganic component, which comprises (A) and (B), which permeable flexible composite is obtained by application of a suspension to a perforated and permeable carrier and subsequently heating at least once during which said at least one inorganic component is solidified on and in the carrier, wherein the composite has a thickness from 5 to 1000 μm, and wherein the carrier has a mesh opening of 50 to 500 μm.

wherein the suspension comprises a sol of at least one oxide of an element selected from the group consisting of metals, metalloids, and composition metals, obtained by hydrolyzing a nitrate, halogenide, carbonate or alcoholate compound of said element, and a compound of at least one element from group III to VII of the periodic system, the suspension containing no organic binder, wherein (A) is said at least one oxide of an element, and (B) is said compound; and wherein (B) has a particle size greater than the particle size of (A).

2. Composite according to claim 1, wherein the composite is permeable for gases, solids or liquids.

3. Composite according to claim 1, wherein the composite is permeable for particles with a size of 0.5 nm to 10 μm.

4. Composite according to claim 1, wherein the carrier contains fibers from at least one of the following materials: carbon, glass, metals, alloys, ceramic materials, minerals, plastics, amorphous substances, natural products, composites or at least one combination of these materials.

5. Composite according to claim 1, wherein the carrier contains at least woven fibers made from metal or alloys.

6. Composite according to claim 1, wherein the carrier contains at least one mesh made from steel.

7. Composite according to claim 1, wherein said inorganic component has a particle size of 0.001 to 25 μm.

8. Composite according to claim 7, wherein (B) contains at least one compound containing at least one of the elements Sc, Y, Ti, Zr, Nb, V, Cr, Mo, W, Mn, Fe, Co, B, Al, In, TI, Si, Ge, Sn, Pb, Sb and Bi, with at least one of the elements Te, Se, S, O, Sb, As, P, N, C, and Ga.

9. Composite according to claim 1, wherein the particle size ratio of (A) to (B) is less than 1:1 and up to and including 1:100.

10. Composite according to claim 1, wherein the quantitative proportion of particles of (A) to particles of (B) is between 0.01 to 1 and 1 to 0.01.

11. Composite according to claim 1, wherein the composite is flexible to a smallest radius of up to 2 nm.

12. Process of preparing a composite as claimed in claim 1, comprising applying said suspension comprising said sol of at least one oxide of an element selected from the group consisting metals, metalloids, and composition metals, obtained by hydrolyzing a nitrate, halogenide, carbonate or alcoholate compound of said element, and a compound of at least one element from group III to VII of the periodic system, the suspension containing no organic binder, to said perforated and permeable mesh carrier, and subsequently heating at least once during which said at least one inorganic component is solidified on and in the carrier.

13. Process according claim 12, wherein the suspension is applied onto or into or onto and into at least one carrier by stamping on, pressing on or in, rolling on, applying with a blade or brush, dipping, spraying, or pouring.

14. Process according to claim 12, wherein perforated and permeable carrier contains one of the following materials: carbon metals, alloys, glass, ceramic materials, plastics, amorphous substances, natural products, composites or at least one combination of these materials.

15. Process according to claim 12, wherein the sols are obtained by hydrolyzing with one liquid, one gas or one solid.

16. Process according to claim 15, wherein water, water vapor, ice, alcohol or an acid or a combination of these compounds is used as the one liquid, the one gas or the one solid for the hydrolysis.

17. Process according to claim 15, wherein the compound to be hydrolyzed is placed in alcohol or in an acid or a combination thereof before hydrolysis.

18. Process according to claim 15, wherein the hydrolysis of the compounds to be hydrolyzed is carried out with at least half the molar ratio of water, in relation to the hydrolyzable group of the hydrolyzable compound.

19. Process according to claim 15, wherein the hydrolyzed compound is treated with at least one organic or inorganic acid.

20. Process according to claim 19, wherein the organic or inorganic acid has a concentration of 10 to 60%.

21. Process according to claim 12, wherein said (A) is at least one oxide of an element selected from the group consisting of Ti, Zr, Al, Si, Sn, Ce and Y.

22. Process according to claim 21, wherein said (A) is at least one oxide of an element selected from the group consisting of Zr, Si, Sn, Ce and Y.

23. Process according to claim 12, wherein (B) is at least one compound from the oxides of the elements of the transition element groups or the elements from group III to V of the periodic system.

24. Process according to claim 23, wherein the oxides are selected from oxides of the elements Sc, Y, Ti, Zr, V, Cr, Nb, Mo, W, Mn, Fe, Ce, Co, B, Al, In, Tl, Si, Ge, Sn, Pb and Bi.

25. Process according to claim 12, wherein the percentage by mass of the suspended components is 0.1 to 500 times the amount of hydrolyzed compound used.

26. Process according to claim 12, wherein the suspension on or in or on and in the carrier is stabilized by heating the composite to between 500 and 1000° C.

27. Process according to claim 26, wherein the composite is subjected to a temperature of between 50 and 10° C. for 10 minutes to 5 hours.

28. Process according to claim 26, wherein the composite is subjected to a temperature of between 100 and 800° C. for 1 second to 10 minutes.

29. A process for the separation of material mixtures comprising filtering material mixtures through the composite of claim 1 to separate components thereof.

30. A process for the separation of liquid mixtures, mixtures containing at least one liquid and at least one gas, mixtures containing at least one solid and at least one liquid, and mixtures containing at least one gas and at least one solid or at least one liquid or one gas comprising filtering said mixtures through the composite of claim 1 to separate components thereof.

31. A process for pressurized separation (process) comprising filtering a mixture of materials under pressure with the composite of claim 1 to separate components thereof.

32. A process for micro-filtration, ultra-filtration or nano-filtration comprising filtering micro-sized, ultra-sized or nano-sized particle containing mixtures through a membrane of the composite of claim 1 to separate the micro-sized, ultra-sized or nano-sized particles.

33. A process comprising carrying out a catalytic process with the composite of claim 1.

34. A formselective membrane comprising the composite of claim 1.

35. A wound module comprising the form-selective membrane of claim 34.

36. A flat module comprising the form-selective membrane of claim 34.

37. A diaphragm or battery separator comprising the composite of claim 1.

38. Composite according to claim 1, wherein said (A) is at least one oxide of an element selected from the group consisting of Zr, Si, Sn, Ce and Y.

* * * * *